United States Patent
Ryan et al.

(10) Patent No.: US 10,560,577 B2
(45) Date of Patent: Feb. 11, 2020

(54) EFFICIENT MECHANISM FOR CUSTOMER FEEDBACK FROM A VOICE CALL

(71) Applicant: Avaya Inc., Santa Clara, CA (US)

(72) Inventors: Adrian Ryan, Co Galway (IE); Dara Geary, Co Galway (IE); William Meaney, Co Galway (IE); Patrick Crowley, Co Galway (IE); Edel Kelly, Co Galway (IE)

(73) Assignee: Avaya Inc., Santa Clara, CA (US)

( * ) Notice: Subject to any disclaimer, the term of this patent is extended or adjusted under 35 U.S.C. 154(b) by 200 days.

(21) Appl. No.: 14/664,363

(22) Filed: Mar. 20, 2015

(65) Prior Publication Data
US 2016/0277576 A1 Sep. 22, 2016

(51) Int. Cl.
*H04M 1/64* (2006.01)
*H04M 3/51* (2006.01)
*H04M 7/12* (2006.01)

(52) U.S. Cl.
CPC ........ *H04M 3/5175* (2013.01); *H04M 3/5166* (2013.01); *H04M 7/1295* (2013.01); *H04M 2203/401* (2013.01)

(58) Field of Classification Search
CPC .. H04M 15/00; H04M 3/4211; H04M 3/4874; H04M 3/4878; H04M 3/4931
USPC ........................................ 379/265.01–256.01
See application file for complete search history.

(56) References Cited

U.S. PATENT DOCUMENTS

| | | | | |
|---|---|---|---|---|
| 2004/0091093 | A1* | 5/2004 | Bookstaff | H04M 3/4874 379/201.01 |
| 2004/0172323 | A1* | 9/2004 | Stamm | G06Q 10/06393 705/7.32 |
| 2006/0002540 | A1* | 1/2006 | Kreiner | H04M 3/5233 379/265.02 |
| 2006/0073786 | A1* | 4/2006 | Sarkar | H04L 65/80 455/24 |
| 2008/0163355 | A1* | 7/2008 | Chu | H04L 67/2823 726/12 |
| 2009/0063247 | A1* | 3/2009 | Burgess | G06Q 30/02 705/7.34 |
| 2013/0077768 | A1* | 3/2013 | Pearce | H04M 3/5175 379/88.01 |
| 2014/0044250 | A1* | 2/2014 | Gartner | H04M 3/00 379/265.09 |
| 2014/0143157 | A1 | 5/2014 | Jeffs et al. | |
| 2015/0117632 | A1* | 4/2015 | Konig | H04M 3/5233 379/265.12 |

OTHER PUBLICATIONS

A P Srivastava; First Examination Report; Indian Patent Application No. 3668/MUM/2015; dated Jul. 31, 2019; Indian Patent Office; Mumbai, India.

* cited by examiner

*Primary Examiner* — Solomon G Bezuayehu
(74) *Attorney, Agent, or Firm* — Stevens & Showalter LLP

(57) ABSTRACT

System and method to provide customer feedback in a telephone call between a customer and a contact center, the method comprising: monitoring an audio media stream from the customer in the telephone call, detecting a dual tone multi frequency (DTMF) feedback code within the monitored media stream, and assigning a feedback rating from the detected feedback code.

19 Claims, 3 Drawing Sheets

300

EFFICIENT MECHANISM FOR CUSTOMER FEEDBACK FROM A VOICE CALL

BACKGROUND

Field

Embodiments of the present invention generally relate to gathering feedback, and, in particular, to a system and method for providing immediate and contemporaneous feedback about a customer call to a calling center, by a customer who may be using a legacy wired or cordless phone.

Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts.

Garnering feedback from a customer when they call into a contact center is a challenge. The most common method of gauging customer satisfaction is to transfer the call to a post-call survey once the agent has dropped off, in which the customer goes through a series of voice menus and rates their experience. Most customers ignore such surveys, to the point where companies often offer an incentive for those customers who stay on the line. However, the vast majority of customers still will not participate because the surveys are perceived as being too much of a hassle.

Related to this is a perception by customers that there is no 'feedback on the feedback'. In other words, if a customer does go to the trouble of providing their opinions, for example to convey how especially helpful and informed the agent had been, the feedback or effect of the feedback generally is not reflected publicly for the customer or others to view and use.

Some systems of the background art pertain to the design of automated survey design and delivery. Such art addresses a known problem in which the longer and more generic a survey is, the lower the response rate becomes. Such background art addresses this problem by analyzing the information content of a communication interaction in order to design a shorter, more focused, and customized survey that identifies at least one issue arising during the communication interaction. However, in order to achieve this goal, the background art considers that the communication interaction may occur over a period of time, such as an hour, day, week, month, or longer and may also occur across a plurality of communication channels. Furthermore, the background art begins when the customer interaction content has already been acquired. The background art therefore lacks immediacy, thus having and effect of causing customer feedback to suffer from fading memory by the customer, changing perceptions, etc.

Therefore, a need exists for businesses who use contact centers to allow their customers provide feedback quickly and easily, e.g., as part of an ongoing call, rather than after the call is completed.

BRIEF SUMMARY

Embodiments are simple enough for almost anyone to use, quick to perform, and usable with any telephony device. Embodiments provide an output that is measurable and usable as feedback for various purposes, e.g., internally to a contact center tracking of metrics, and to customer-facing websites and interfaces so the public can see both positive and negative comments.

In one embodiment, a method to provide customer feedback in a telephone call between a customer and a contact center, the method comprising: monitoring an audio media stream from the customer in the telephone call, detecting a dual tone multi frequency (DTMF) feedback code within the monitored media stream, and assigning a feedback rating from the detected feedback code.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
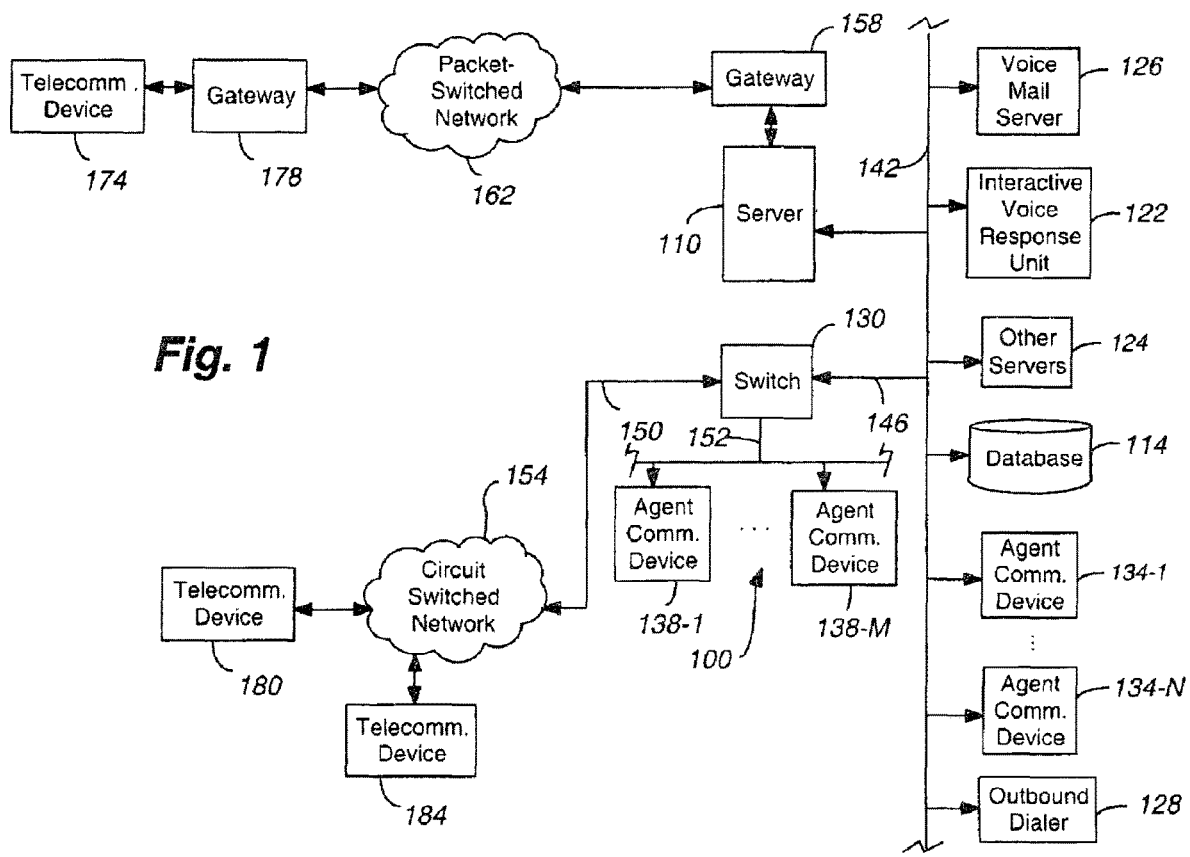
FIG. 1 is a block diagram depicting a contact center in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize customer-provided feedback.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "contact" (as in "customer contact") refers to a communication from a customer or potential customer, in which a request is presented to a contact center. The request may be by way of any communication medium such as, but not limited to, a telephone call, e-mail, instant message, web chat, and the like, unless the context of usage indicates otherwise.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like. The term "server" where used may refer to an individual server or a cluster of servers, unless a different meaning is clearly indicated.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible, non-transitory storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. The media stream(s) may be communicated using a Real-time Transport Protocol ("RTP"), also known as RFC 3550 (formerly RFC 1889), for transporting real-time data and providing Quality of Service ("QoS") feedback. The content of RFC 3550 is hereby incorporated by reference in its entirety.

Referring now to FIG. 1, which is a block diagram depicting a contact center in accordance with an embodiment of the present invention, there is provided a contact center 100. The contact center generally comprises a central server 110, a set of data stores or databases 114 containing contact or customer related information and other information that can enhance the value and efficiency of the contact, and a plurality of servers, for example, a voice mail server 126, an Interactive Voice Response unit or "IVR" 122, and other servers 124, an outbound dialer 128, a switch 130, a plurality of working agents operating packet-switched (first) telecommunication devices 134-1 to N (such as, but not limited to, computer work stations or personal computers), and/or circuit-switched (second) telecommunication devices 138-1 to M, all interconnected by a local area network LAN (or wide area network WAN) 142. The servers can be connected via optional communication lines 146 to the switch 130.

As will be appreciated, the other servers 124 can also include a scanner (which is normally not connected to the switch 130 or Web server), VoIP software, video call software, voice messaging software, an IP voice server, a fax server, a web server, an instant messaging server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The gateway 158 may comprise Avaya Inc.'s, G250™, G350™, G430™, G450™, G650™, G700™, and IG550™ Media Gateways and may be implemented as hardware such as, but not limited to, via an adjunct processor (as shown) or as a chip in the server.

The first telecommunication devices 134-1, . . . 134-N are packet-switched device, and may include, for example, IP hardphones, such as the Avaya Inc.'s, 1600™, 4600™, and 5600™ Series IP Phones™; IP softphones running on any hardware platform such as PCs, Macs, smartphones, or tablets, (such as Avaya Inc.'s, IP Softphone™); Personal Digital Assistants or PDAs; Personal Computers or PCs, laptops; packet-based H.320 video phones and/or conferencing units; packet-based voice messaging and response units; and packet-based traditional computer telephony adjuncts.

The second telecommunication devices 138-1, . . . 138-M are circuit-switched. Each of the telecommunication devices 138-1, . . . 138-M corresponds to one of a set of internal extensions, for example, Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner.

The second telecommunication devices can include, for example, wired and wireless telephones, PDAs, H.320 video phones and conferencing units, voice messaging and response units, and traditional computer telephony adjuncts. Exemplary digital telecommunication devices include Avaya Inc.'s 2400™, 5400™, and 9600™ Series phones.

It should be noted that embodiments of the present invention do not require any particular type of information transport medium between switch or server and first and second telecommunication devices, i.e., embodiments of the present invention may be implemented with any desired type of transport medium as well as combinations of different types of transport media.

The packet-switched network 162 of FIG. 1 may comprise any data and/or distributed processing network such as, but not limited to, the Internet. The network 162 typically includes proxies (not shown), registrars (not shown), and routers (not shown) for managing packet flows. The packet-switched network 162 is in (wireless or wired) communication with an external first telecommunication device 174 via a gateway 178, and the circuit-switched network 154 with an external (wired) second telecommunication device 180 and (wireless) third (customer) telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol or SIP compatible and may include interfaces for various other protocols such as, but not limited to, the Lightweight Directory Access Protocol or LDAP, H.248, H.323, Simple Mail Transfer Protocol or SMTP, IMAP4, ISDN, E1/T1, and analog line or trunk.

It should be emphasized the configuration of the switch, server, user telecommunication devices, and other elements as shown in FIG. 1 is for purposes of illustration only and should not be construed as limiting embodiments of the present invention to any particular arrangement of elements.

In handling incoming calls, a contact center is capable of exchanging Internet Protocol (IP) data packets, Session Initiation Protocol (SIP) messages, Voice over IP (VoIP) traffic, and stream-related messages (e.g., Real Time Streaming Protocol (RTSP) messages, etc.) with calling endpoints such as endpoint 202. As those who are skilled in the art will appreciate, after reading this specification, contact center 210 is capable of communicating by using other protocols, in some alternative embodiments.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to route, and then forward the contact to a specific contact center resource such as, but not limited to, the IVR unit 122, the voice mail server 126, the instant messaging server, and/or first or second telecommunication device 134, 138 associated with a selected agent. The server 110 distributes and connects these contacts to telecommunication devices of available agents, based on the predetermined criteria noted above.

When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In the CRM environment, both real-time and non-real-time contacts may be handled and distributed with equal efficiency and effectiveness. The server 110 may use a work assignment algorithm that, for example, does not use a queue. In any event, the contact may have associated or "known" contact information. This contact information may include, for example, how long the contact has been waiting, the contact's priority, the contact's media channel, the contact's business value, etc. The contact may be handled based on such known contact information.

The server and/or switch can be a software-controlled system including a processing unit (CPU), microprocessor, or other type of digital data processor executing software or an Application-Specific Integrated Circuit (ASIC) as well as various portions or combinations of such elements. The memory may comprise random access memory (RAM), a read-only memory (ROM), or combinations of these and other types of electronic memory devices. Embodiments of the present invention may be implemented as software, hardware (such as, but not limited to, a logic circuit), or a combination thereof.

The contact center 100, in one configuration, includes an automated instant messaging server as another server 124. In such an embodiment, when a customer initiates contact with the contact center 100 using instant messaging, a new instant messaging thread is initiated by the customer. As will be appreciated, instant messages are stand-alone messages, and threading (or associating instant messages with data structures associated with an instant messaging session between a customer and an agent) occurs at the application level. The association is typically effected by pairing an electronic address (e.g., IP address, Media Access Control (MAC)

address, telephone number, mobile-device identifier, and the like) of the customer's communication device with an electronic address (e.g., IP address, MAC address, telephone number, mobile-device identifier, and the like) of the agent's communication device in a manner similar to that used for a voice call.

The instant messaging server can be configured to send an automated response, such as "Please wait while I connect you with an agent" and/or to send the instant message to an automated interactive response unit for data collection. The instant messaging server subsequently notifies the server 110 of the existence of a new instant messaging contact, and the server 110 decides whether a suitable (human) agent is available. If an agent is available, the server 110 instructs the instant messaging server to redirect the instant messaging conversation to that available agent's communication device 134-1 . . . N. The server 110 routes, substantially in real-time, subsequent instant messages from the agent's communication device to the customer's communication device and from the customer's communication device to the agent's communication device.

Figure 2:
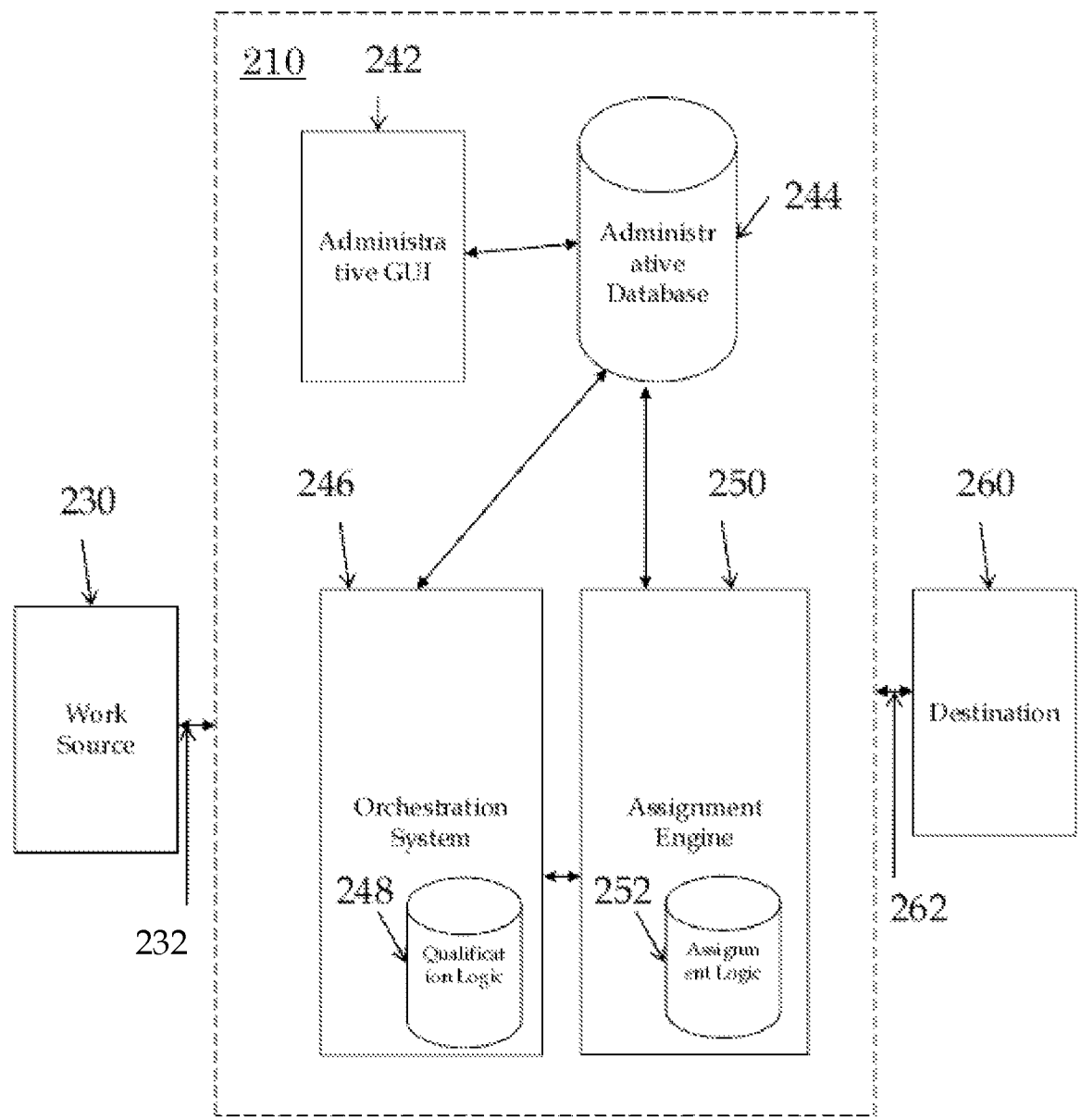
FIG. 2 is a system level block diagram depicting an administrator server in accordance with an embodiment of the present invention.

Referring to FIG. 2, which depicts a block diagram of a server 210 in accordance with an embodiment of the present invention, there is provided a server 210 in communication with a work source 230, which may comprise customer or any other entity capable of originating a transmission of work or a contact. The server 210 may be configured in communication with the work source 230 generally via a work source communication means 232, which may comprise any means of communicating data, for example, one or more trunks, phone lines, wireless connections, Bluetooth connections, digital connections, analog connection, combinations thereof, and the like.

In some embodiments of the present invention, the server 210 may also be in communication with a destination 260, which may comprise an agent or any entity capable of receiving a transmission of work or a contact. The server 210 may be configured in communication with the destination 260 generally via an agent communication means 262, which may comprise any means of communicating data, for example, a voice-and-data transmission line such as LAN and/or a circuit switched voice line, wireless connections, Bluetooth connections, digital connections, analog connections, combinations thereof, and the like. The server 210 may comprise any type of computer server, for example, a Basic Call Management System ("BCMS") and a Call Management System ("CMS") capable of segmenting work.

The server 210 can be any architecture for directing contacts to one or more telecommunication devices. Illustratively, the server may be a modified in the form of Avaya Inc.'s Private-Branch Exchange (PBX)-based ACD system; MultiVantage™ PBX, CRM Central 2000 Server™, Communication Manager™, Business Advocate™, Call Center™, Contact Center Express™, Interaction Center™, and/or S8300™, S8400™, S8500™, and S8700™ servers; or Nortel's Business Communications Manager Intelligent Contact Center™, Contact Center-Express™, Contact Center Manager Server™, Contact Center Portfolio™, and Messaging 100/150 Basic Contact Center™.

In many embodiments, the server 210 may be a stored-program-controlled system that conventionally includes, for example, interfaces to external communication links, a communications switching fabric, service circuits (e.g., tone generators, announcement circuits, and the like), memory for storing control programs and data, and a processor (i.e., a computer) for executing the stored control programs to control the interfaces and the fabric and to provide automatic contact-distribution functionality. The server 210 generally may include a network interface card (not shown) to provide services to the serviced telecommunication devices.

The server 210 may be configured for segmenting work in the contact center and may comprise an administrative database 244 configured to store at least a common skill option and a service skill option; an administrative graphical user interface ("GUI") 242 for accessing at least the administrative database 244 and configuring the common skill option and the service skill option; an orchestration system 246 configured to receive a contact from a work source 230 and orchestrate the contact according to a qualification logic stored in a qualification logic database 248; and an assignment engine 250 configured to receive the contact, the common skill option, and the service skill option, and segment the contact according to an assignment logic stored in an assignment logic database 252. In accordance with some embodiments of the present invention, the qualification logic stored in the qualification logic database 248 and the assignment logic stored in the assignment logic database 252 may comprise any logical set of steps or sequences configured to process data at the contact center in accordance with any embodiment of the present invention.

The server and/or switch can be a software-controlled system including a processing unit (CPU), microprocessor, or other type of digital data processor executing software or an Application-Specific Integrated Circuit (ASIC) as well as various portions or combinations of such elements.

Web sites sometimes include a control that allow a user browsing a public web site to register a crude measure of approval of the content of the web site, e.g., a "like" button, or thumbs-up/thumbs-down, etc. In such scenarios, the communication medium (i.e., a web page) is text based and usually interactive with many hyperlinks to further information. Correspondingly, the mechanism for registering approval is also text-based, e.g., the word "Like" as a hyperlink, or at least visual-based, e.g., a hyperlinked thumb graphic. Notably, the approval usually is interpreted as being with respect to the information content itself of the web site, and not a measure or rating of how the content was delivered. Furthermore, the reader of the web site generally can take as long as they want to read the web site, and take as long as they want to provide their approval.

In contrast, in the context of an inbound telephone call to a call center by a customer, the interaction ordinarily is voice-based. Textual or graphical interaction is ordinarily very limited even with a smart phone, or may be substantially impossible with a legacy wired or cordless telephone. Furthermore, the interaction ordinarily proceeds in real-time, with no chance to pause the interaction, or to spend a lot of time post-call on feedback.

To deal with the limitations of a voice-based interface that is usable with legacy telephones such as one or more of telecommunication devices 174, 180 and/or 184, embodiments in accordance with the present disclosure are able to gather customer feedback during the voice-based communication interaction. Embodiments support a universal, 'bring your own device' philosophy, and provide a simple approach that allows feedback to be registered as the interaction is taking place —not after the fact —in an efficient and quick manner.

In accordance with an embodiment of the present disclosure, a caller may be prompted before or during a call, by a recording or by an agent as part of the agent's conversation, to use the telephone keypad to indicate feedback (e.g., a 'Like' or 'Dislike') for the customer care experience by use of a feedback code. For example, a caller may be informed that at any time during the call, the caller may indicate a 'Like' for the call by dialing the dual tone multi frequency (DTMF) code "**1", and/or indicate 'Dislike' for the call by dialing the DTMF code "*#1". In that situation, "**1" is a positive feedback code and "*#1" is a negative feedback code. Other feedback codes may be used so long as they do not conflict with any other automated codes whose presence may be monitored. The feedback usually is interpreted as being a measure or rating of how the customer support was delivered.

Embodiments in accordance with the present disclosure allow only the customer to submit feedback. Embodiments accomplish this by monitoring only a media from the customer's telephone (e.g., one or more of telecommunication devices 174, 180 and/or 184) for a feedback code, and/or disregarding any feedback codes in an audio media stream from the agent. Such separation of agent and customer audio media streams is a well-known feature of some call center media servers such as the Avaya Media Server™, represented by server 110 of FIG. 1.

Server 110 may include a call feature sequencer (not illustrated separately in FIG. 1). The feature sequencer may provide communication features such as feedback code interpretation and processing directly into the communication session, or the feature sequencer can determine an application sequence that will be invoked during set-up and used during the communication session. In accordance with at least some embodiments, the feature sequencer can determine an application sequence and cause one or more applications such as a feedback code interpreter and processor to be sequenced into a communication session.

In some embodiments, a feedback code may be entered by a customer only once per call, and subsequent attempts to enter a feedback code may be ignored. In other embodiments, a feedback code may be entered multiple times, but only the most-recently entered feedback code would be recorded as the feedback for the entire call. The latter embodiment may be useful for situations in which, e.g., an agitated caller does not have a good impression at the beginning of a call, but by the end of the call the agent is able to turn around the customer's perception.

In other embodiments, multiple feedback codes may be allowed during a call, and the overall customer feedback may be calculated as a time-weighted sum of feedback codes weighted by the time since the previous feedback code (or since the beginning of the call for the first feedback code). For example, for a 60-second call, if a positive feedback code is entered at the 40-second mark but a negative feedback code at the 60-second mark (e.g., at the conclusion), in this embodiment the overall call may be deemed positive. In some embodiments, the overall call may be assigned a score of ⅔ positive.

In some embodiments, a feedback score may be weighted by the length of a call, e.g., an agent may be accorded greater positive feedback for a long and complicated call. In other embodiments, if efficiency and high throughput are highly weighted in contact center key performance indicators (KPIs), a short call with positive feedback may be given greater positive feedback than a long call with positive feedback.

The selection of how to handle multiple feedback codes and/or their weighting may be a configurable option, under control of a system administrator.

Some embodiments may include a configurable option to allow the agent to hear or otherwise to be informed of feedback from the customer (both positive and negative), thus tending to affect the agent's behavior during the remainder of the present call and for future calls. In some embodiments, an agent may be informed of only positive feedback or of only negative feedback. Such selective informing of feedback to the agent may be useful if a history of previous caller interaction with this agent shows that the agent's behavior improves particularly well with knowledge of positive feedback but not negative feedback, or vice versa.

In some embodiments, entry of a feedback code may increment or otherwise affect more than one counter. For example, a first counter may be a feedback (e.g., an effectiveness) for a service that the agent is staffing. A composite feedback score (e.g., the number of positive feedbacks minus the number of negative feedbacks normalized to the number of calls, etc.) may be made available on a business' external web site for other customers, potential customers, or the public to see. For example, if the service department at the local BMW dealer has had ten positive interactions by noon on a particular day, this would be an indicator to others browsing the website of good customer service.

In some embodiments, the feedback counter or score may be included with a recitation of the menu choices for those callers who dial the contact center directly. For example, an interactive voice response (IVR) system used by the contact center may include a spoken rating of the service to callers who may not have the benefit of a website to see the current score (e.g., callers who may be using a basic telephone). For example, the IVR menu may recite something like: "Press one for Car Insurance—current feedback score 7.8 out of ten; press two for Home Insurance—currently rated 6.1 out of ten; or press three for Motorcycle Insurance—our top service at 9.5 out of ten."

A second counter affected by a feedback score may be a counter related to the agents themselves, and intended to be used to determine internal agent performance metrics. Such a counter may be linked to a reward system, compensation, benefits, and the like. Agent scores may be posted at the calling center to act as an incentive through peer pressure to improve and/or compete for the highest score, or as examples of positive news.

In accordance with another embodiment of the present disclosure, the numeric keys on a telephone keypad may be used to provide a multi-level feedback rating. For example, embodiments may interpret the star key ("*") followed within a predetermined amount of time by a number to represent a numeric rating of 0 to 9 (or 1 to 9 if zero is not considered a valid rating). An appropriate message may be played to the customer before, during or after the call to explain the rating system, including whether "9" is the best rating or the worst rating. The predetermined amount of time enables a timeout in case the customer accidentally pressed the star key. The DTMF code "**x", in which "x" is any number between 0 and 9, is a unique unused pattern today which is not believed to collide with other known codes.

An advantage provided by this embodiment is a finer level of granularity, and a simpler way to register negative feedback because a separate feedback code is not needed. This embodiment helps enable a more detailed categorization of the customer experience, and may be more amenable to ranking of agent performance. The embodiment may also provide a ranking that is more useful to a customer, e.g., ratings of 7 to 9 may be depicted as a 'thumbs up', while ratings of 1 to 3 may be depicted as a 'thumbs down'.

Embodiments in accordance with the present disclosure may be useful if a business outsources its contact center operations to multiple outsourcing companies. Comparing customer service across multiple outsourcing companies becomes easier and more objective when numeric ratings based customer ratings is available. The customer ratings may also be used as a data point for service level agreements.

In accordance with another embodiment of the present disclosure, a spoken utterance by a customer may be captured at the end of the call, upon prompting by a message that the customer may provide spoken feedback to the system, typically after the agent has been disconnected from the call. It will be assumed that the captured utterance will contain the feedback. The message may be provided automatically by the contact center, or by the agent just prior to disconnecting from the call. The customer may speak some comments, which are captured by real time speech analytics or speech to text recognition. Spoken comments may be filtered for relevance, interpreted, and categorized. A customer may be informed of such an option by a message such as "If at any time you want to speak your feedback, wait until the advisor has disconnected, and speak your comments after the tone."

This embodiment may be amenable to a text-based graphical interface to present feedback ratings to prospective future customers, where prospective future customers may peruse both the rating and the spoken feedback of other customers, prior to the prospective future customer calling the business or contact center. Prospective future customers may use the rating and feedback as a differentiator when choosing where to bring their business.

Embodiments in accordance with the present disclosure are compatible with and complimentary with smart phones and WebRTC-enabled websites having a "Click-to-Call" capability. Feedback gathered may be graphically displayed to the end user. On smart phones, the keypad combination may also be encapsulated within a single button or a single operation.

Embodiments in accordance with the present disclosure offer advantages for providing feedback, compared to a smart phone application, at least for several reasons.

First, embodiments are compatible with legacy wired or cordless telephone handsets in case the end user does not have a smart phone. A cordless telephone is known as a telephone that includes a base station and a handset, which transmit a telephone call between each other with radio frequency (RF) waves in defined frequency bands (e.g., 900 MHz, 2.4 GHz or 6 GHz), without necessarily the use of a cellular telephone communication signal.

Second, even if a user has a smart phone, embodiments described herein are operable without a need for the user to install a specialized application program on the smart phone. A customer may perceive that downloading and installing in advance a specialized application program would likely be more trouble than any benefit gained from a one-time or very infrequent desire to provide feedback on a customer experience.

Third, even if a customer may have both a smartphone and a specialized application program installed on the smart phone, then depending on the design of the application program the customer may not be able to use the application program if the customer calls the contact center telephone number directly from their contacts or from the customer's memory.

Figure 3:
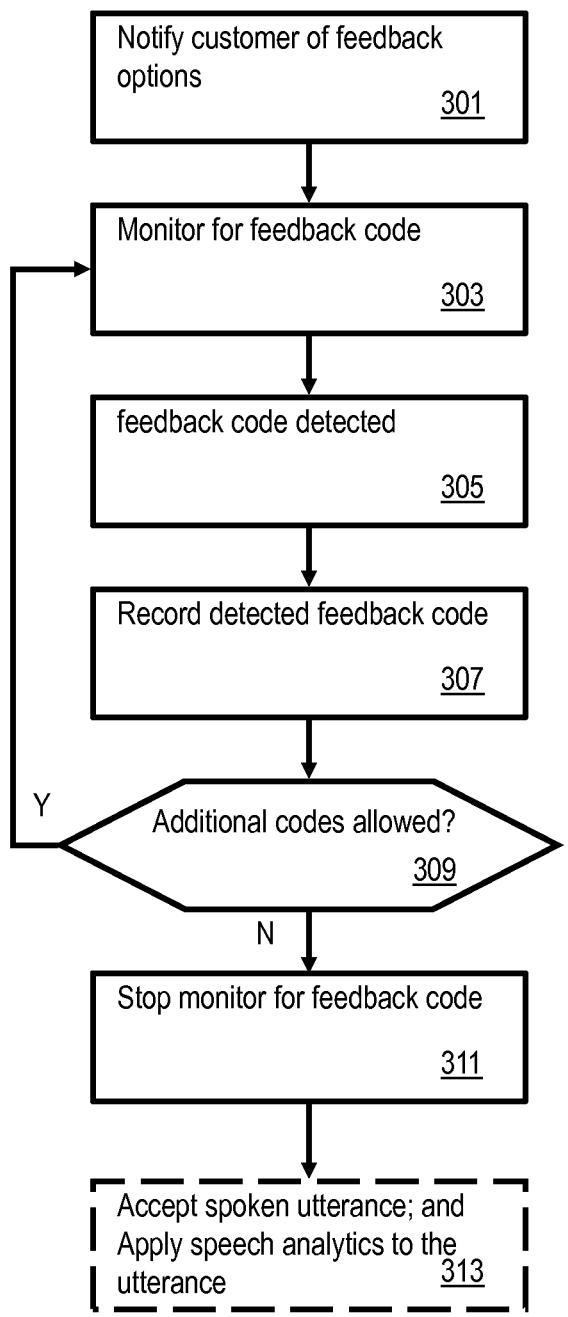
FIG. 3 illustrates a method in accordance with an embodiment of the present invention.

FIG. 3 illustrates at a high level of abstraction a method 300 in accordance with an embodiment of the invention. Method 300 begins at step 301, at which notification is provided to a customer that feedback can be submitted for the call. The notification may include instructions for how to submit feedback.

Next, method 300 transitions to step 303, at which an audio media stream from the customer may be substantially continuously monitored for the presence of a feedback code. The feedback code may be provided by any of the embodiments previously described, e.g., a feedback code such as by dialing "**1", "#1", or a numeric code like "9".

Next, if a customer enters a feedback code, method 300 transitions to step 305, at which the feedback code is detected by the calling center, e.g., by server 110.

Next, method 300 transitions to step 307, at which the detected feedback code is interpreted, and an appropriate record of the feedback code is made. For example, an appropriate record may include a server in the contact center incrementing one or more counters related to the customer's satisfaction with the agent. Step 307 may also include implementation of a time-based weighting of feedback codes if so desired.

Next, method 300 transitions to decision step 309, at which a decision is made whether additional feedback codes are allowed. As described earlier, some embodiments may accept just one feedback code per call, and other embodiments may accept multiple feedback codes with different methods for how to deal with the second and subsequent feedback code per call. If the result of decision step 309 is positive, control of method 300 reverts to step 303. If the result of decision step 309 is negative, control of method 300 proceeds to step 311.

At step 311, method 300 stops monitoring for a feedback code.

Next, method 300 transitions to optional step 313, at which spoken feedback may be accepted. Step 313 also encompasses any speech analytics or other processing of the spoken feedback that may be provided, in order to convert the spoken feedback into actionable information (i.e., information that can be used to take some further action such as rewarding an agent).

Embodiments of the present invention include a system having one or more processing units coupled to one or more memories. The one or more memories may be configured to store software that, when executed by the one or more processing unit, allows practice of embodiments described herein, at least by use of processes described herein, including at least in FIG. 3 and related text.

The disclosed methods may be readily implemented in software, such as by using object or object-oriented software development environments that provide portable source code that may be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112, ¶ 6, and any claim without the word "means" is not so intended.

What is claimed is:

1. A method to provide customer feedback in a telephone call between a customer and a human agent of a contact center, comprising:
    monitoring by a processor an audio media stream from the customer during a voice-based communication interaction of the telephone call between the customer and the human contact center agent;
    detecting by the processor a feedback code generated by the customer during the voice-based telephone call between the customer and the human contact center agent and related to the customer's satisfaction with the human contact center agent during the call; and
    interpreting by the processor the detected feedback code and assigning by the processor a feedback rating based on the interpretation of the detected feedback code, wherein multiple feedback codes are received and an overall feedback rating is calculated as a time-weighted sum of all feedback codes entered by the customer during the telephone call weighted by the time since the beginning of the telephone call for the first feedback code and since the previous feedback code for one or more feedbacks codes entered after the first feedback code.

2. The method of claim 1, further comprising the step of notifying the customer of an ability to provide feedback by use of DTMF feedback codes.

3. The method of claim 1, wherein the feedback code comprises one of a first code to indicate a positive feedback or a second code to indicate a negative feedback.

4. The method of claim 1, wherein how to handle multiple feedback codes is a configurable option.

5. The method of claim 1, wherein the processor sequences a feedback code interpreter into the voice-based communication of the telephone call.

6. A system to provide customer feedback in a telephone call between a customer and a human agent of a contact center, comprising:
    a server comprising a processor and a memory storing software instructions, the processor coupled to the memory executes the software instructions to:
        monitor an audio media stream from the customer during a voice-based communication interaction of the telephone call between the customer and the human contact center agent;
        detect a feedback code generated by the customer during the voice-based telephone call between the customer and the human contact center agent and related to the customer's satisfaction with the human contact center agent during the call; and
        interpret the detected feedback code and assign a feedback rating based on the interpretation of the detected feedback code, wherein multiple feedback codes are received and an overall feedback rating is calculated as a time-weighted sum of all feedback codes entered by the customer during the telephone call weighted by the time since the beginning of the telephone call for the first feedback code and since the previous feedback code for one or more feedbacks codes entered after the first feedback code.

7. The system of claim 6, wherein the processor further executes the software instructions to notify the customer of an ability to provide feedback by use of DTMF feedback codes.

8. The system of claim 6, wherein the feedback code comprises one of a first code to indicate a positive feedback or a second code to indicate a negative feedback.

9. The system of claim 6, wherein how to handle multiple feedback codes is a configurable option.

10. The system of claim 6, wherein the processor further executes the software instructions to assign a second feedback rating from the detected feedback code.

11. The method of claim 1, wherein the processor monitors an audio media stream from the customer for a feedback code while disregarding any feedback codes in an audio media stream from an agent at the contact center.

12. The system of claim 7, where the processor further executes the software instructions to sequence a feedback code interpreter into the voice-based communication of the telephone call.

13. The method of claim 1, wherein the feedback rating is provided by the processor to the contact center agent during the voice-based communication interaction of the telephone call.

14. The method of claim 1, wherein the feedback code is used to affect at least one feedback counter, the at least one feedback counter is associated with at least one of:
    a service that the contact center agent is staffing; or
    the contact center agent himself.

15. The method of claim 1, wherein the feedback code is used to affect at least one feedback counter, the at least one feedback counter comprises first and second counters, the first counter associated with a service that the contact center agent is staffing, and the second counter associated with the contact center agent himself.

16. The system of claim 7, wherein the feedback code is used to affect at least one feedback counter, the at least one feedback counter is associated with at least one of:
    a service that the contact center agent is staffing; or
    the contact center agent himself.

17. The method of claim 1, wherein the feedback code is generated by the activation of multiple keys on a keypad to generate the feedback code, wherein the feedback code defined by the activation of the multiple keys is interpreted by the processor.

18. The method of claim 1, wherein the feedback code comprises a dual tone multi frequency (DTMF) feedback code within the monitored media stream.

19. The system of claim 6, wherein the feedback code comprises a dual tone multi frequency (DTMF) feedback code within the monitored media stream.

* * * * *

UNITED STATES PATENT AND TRADEMARK OFFICE
CERTIFICATE OF CORRECTION

PATENT NO. : 10,560,577 B2
APPLICATION NO. : 14/664363
DATED : February 11, 2020
INVENTOR(S) : Adrian Ryan et al.

Page 1 of 1

It is certified that error appears in the above-identified patent and that said Letters Patent is hereby corrected as shown below:

In the Claims

Column 13, Line 47, Claim 1, "more feedbacks codes" should read --more feedback codes--
Column 14, Line 17, Claim 6, "feedbacks codes" should read --feedback codes--

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*